April 4, 1939.    E. RISTAU    2,152,920
HARVESTER ATTACHMENT
Filed Sept. 22, 1937
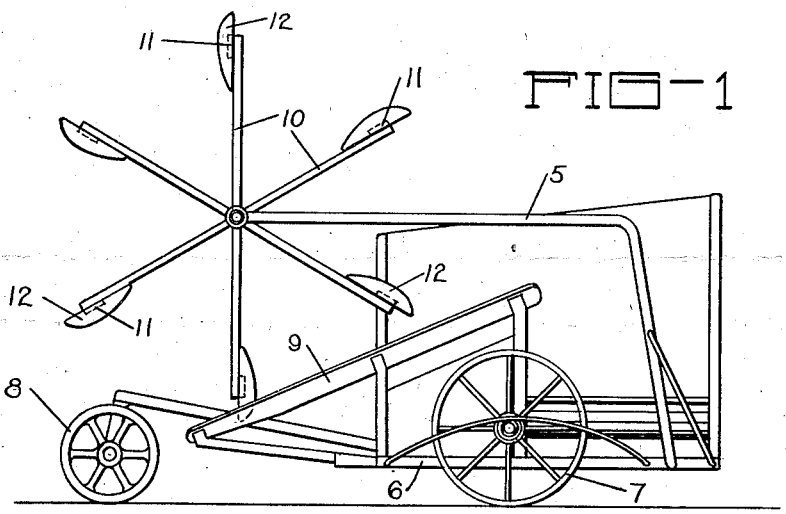
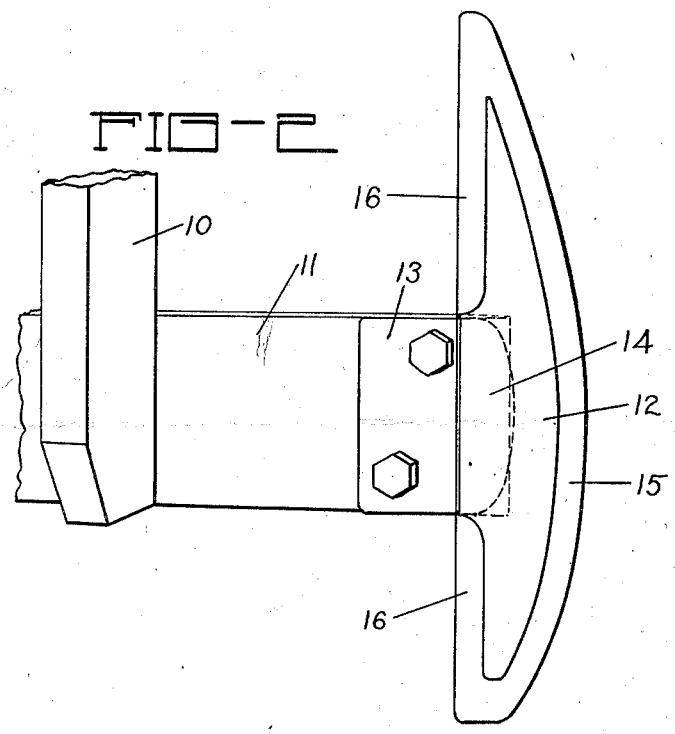
Inventor
Ernest Ristau,
By Walter N. Haskell,
his Attorney Patented Apr. 4, 1939

2,152,920

UNITED STATES PATENT OFFICE 2,152,920

HARVESTER ATTACHMENT

Ernest Ristau, Davenport, Iowa

Application September 22, 1937, Serial No. 165,093

3 Claims. (Cl. 56—315)

My invention has reference to a harvester attachment, and has for its chief purpose to prevent foreign growth among the grain that is being cut, more specially morning glories, from gathering and clogging on the mold-board of the machine. In some cases, where there is a heavy growth of such vines, they are picked up by the mold-board, and collect thereon, to such an extent that it is necessary to stop the machine and remove them. If this happens frequently in the cutting of a field of grain it gets to be an annoyance, and interference with the work.

As set forth herein the invention consists of a series of cutting implements, attached to the ends of the slats of the reel of the harvester, and passing sufficiently near the mold-board to cut the vines and tendrills therefrom. It can be used on a harvester, or on a combine or other machine which includes a platform and reel for laying the grain over on the platform.

In the drawing:—

Fig. 1 shows a portion of a grain harvester in side elevation, with the invention applied thereto.

Fig. 2 shows one of the tools in perspective, attached to the end of one of the slats of a reel.

The reference number 5 indicates the frame of a harvester, supported on a platform 6, which is mounted on carrying wheels 6 and 7. At one side of the platform is supported a mold-board 9, and at the end of the frame is rotatably supported a reel formed of arms 10 and cross-slats 11, by means of which the grain is laid over on the platform as it is cut.

Fixed to the end of each of the slats 11 is a knife 12, by means of an angle plate 13, provided with means for attachment to the slat, and a plate 14 at an angle therewith, and preferably welded to the face of the knife. Each of the knives has a straight edge on the side adjacent to the slat and an arcuate edge at the opposite side. The arcuate edge is sharpened so as to form a blade 15, and the blade is carried round to the other side of the knife, as at 16.

In the turning of the reel the knives are brought in succession along a path which is near the mold-board 9, and vines or tendrils trying to gather on the mold-board are subjected to a continuous cutting operation, with the severed vines falling on opposite sides of said mold-board. Those on the inside fall on the platform and are carried along with the grain. The end of the knife which is uppermost during the cutting operation is somewhat pointed, and sharpened so that any of the vines that try to gather thereon are cut into, and the knives are self-cleaning. This also prevents the vines from clogging on the ends of the slats.

By the means herein set forth the mold-board can be kept free of morning-glory and other vines and trailers, and the necessity of occassionally stopping the machine to clean the same is done away with.

It is a recognized fact that other types of cutters can be made use of, and that they can be supported upon any movable part which will bring them into contact with the material that is tending to clog any part of the machine.

What I claim and desire to secure, is;

1. In combination with a harvester and relatively stationary part thereof, and rotatable reel thereon, a knife attached to said reel, and movable along said stationary part of the harvester, to shear a collection of vines therefrom.

2. In combination with a harvester, including a relatively fixed part and a reel rotatably mounted thereon, provided with a plurality of slats, knives fixed to said slats, and movable in a path to remove a quantity of vines from said fixed part of the harvester.

3. In combination with a harvester, and mold-board thereof, and a reel rotatably mounted on said harvester, a knife attached to said reel, and movable in a path adjacent to said mold-board, to shear a quantity of vines accumulated thereon.

ERNEST RISTAU.